United States Patent [19]
Tannert et al.

[11] Patent Number: 6,023,398
[45] Date of Patent: Feb. 8, 2000

[54] DISK CARTRIDGE WITH ROTATABLE CARTRIDGE DOOR

[75] Inventors: Hans Tannert, Cupertino, Calif.; Ray Sarraf, Superior, Colo.

[73] Assignee: Iomega Corporation, Roy, Utah

[21] Appl. No.: 08/961,592

[22] Filed: Oct. 31, 1997

[51] Int. Cl.[7] .................................................. G11B 23/03
[52] U.S. Cl. ........................................ 360/133; 369/291
[58] Field of Search ............................... 360/97.01, 132, 360/133; 369/291

[56] References Cited

U.S. PATENT DOCUMENTS

| | | | |
|---|---|---|---|
| 4,320,430 | 3/1982 | Vogt | 360/133 |
| 4,550,354 | 10/1985 | Wakabayashi et al. | 360/133 |
| 5,570,252 | 10/1996 | Sumner et al. | 360/133 |
| 5,650,899 | 7/1997 | Schick et al. | 360/133 |
| 5,671,109 | 9/1997 | Sumner et al. | 360/133 |
| 5,691,860 | 11/1997 | Hoppe | 360/133 |
| 5,694,278 | 12/1997 | Sumner | 360/133 |
| 5,768,074 | 6/1998 | Sumner et al. | 360/133 |

*Primary Examiner*—William J. Klimowicz
*Attorney, Agent, or Firm*—Burns, Doane, Swecker & Mathis LLP

[57] ABSTRACT

A disk cartridge for data storage includes a door assembly which is opened as the disk cartridge is inserted in the disk drive. A rotatable cartridge door rotates between a open position and a closed position by moving a flexible band attached to the cartridge door. An end of the flexible band extends through a slot in the side wall of the disk cartridge such that the end of the flexible band can be caught by a leaf spring hook of the disk drive. The leaf spring hook within the disk drive grasps the end of the flexible band and holds the flexible band stationary in the disk drive as the disk cartridge is inserted. The cartridge door is opened by drawing the flexible band along the side wall of the disk cartridge. The rotatable disk cartridge door according to the present invention requires less vertical space and creates less particulate contamination than known disk cartridge door assemblies.

23 Claims, 5 Drawing Sheets

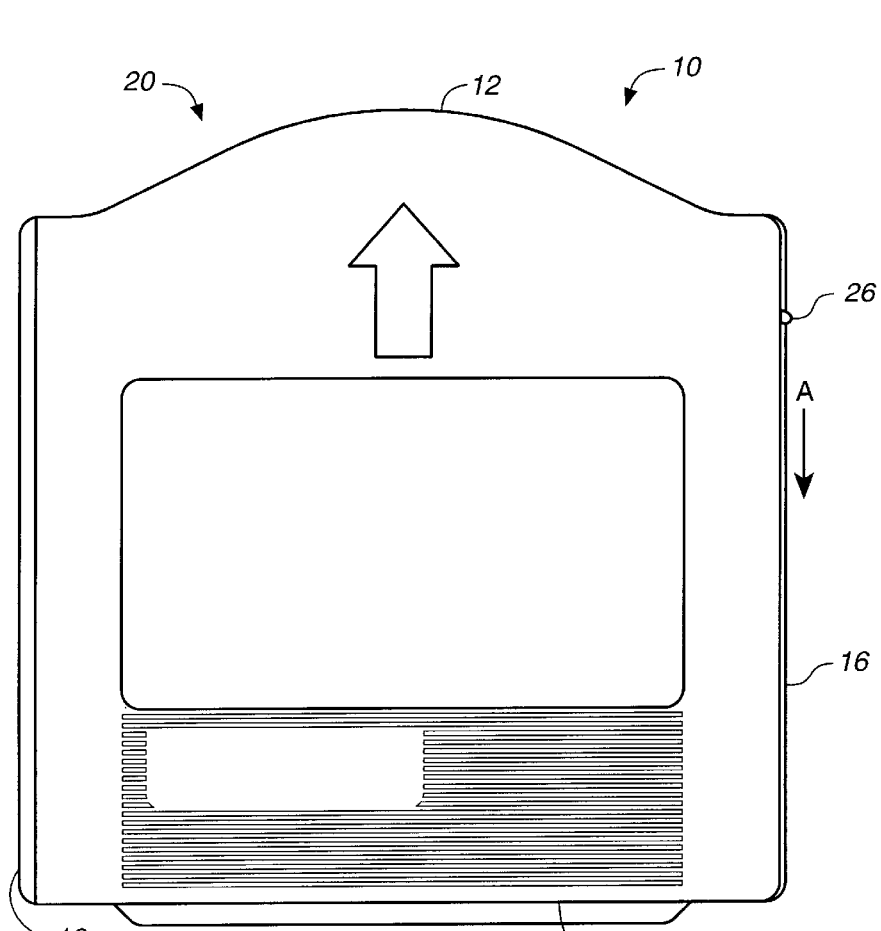
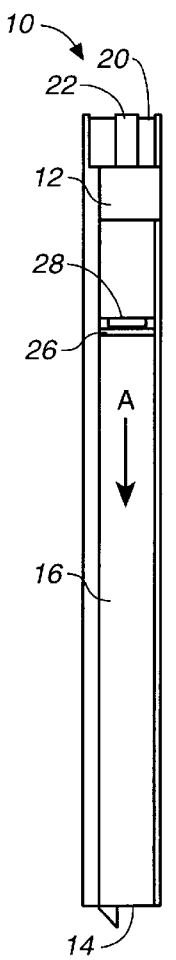
FIG._1
FIG._3
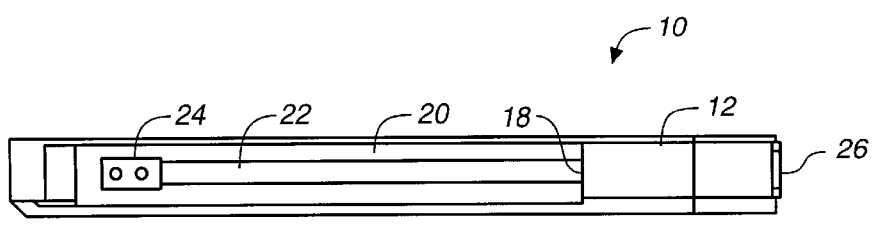
FIG._2

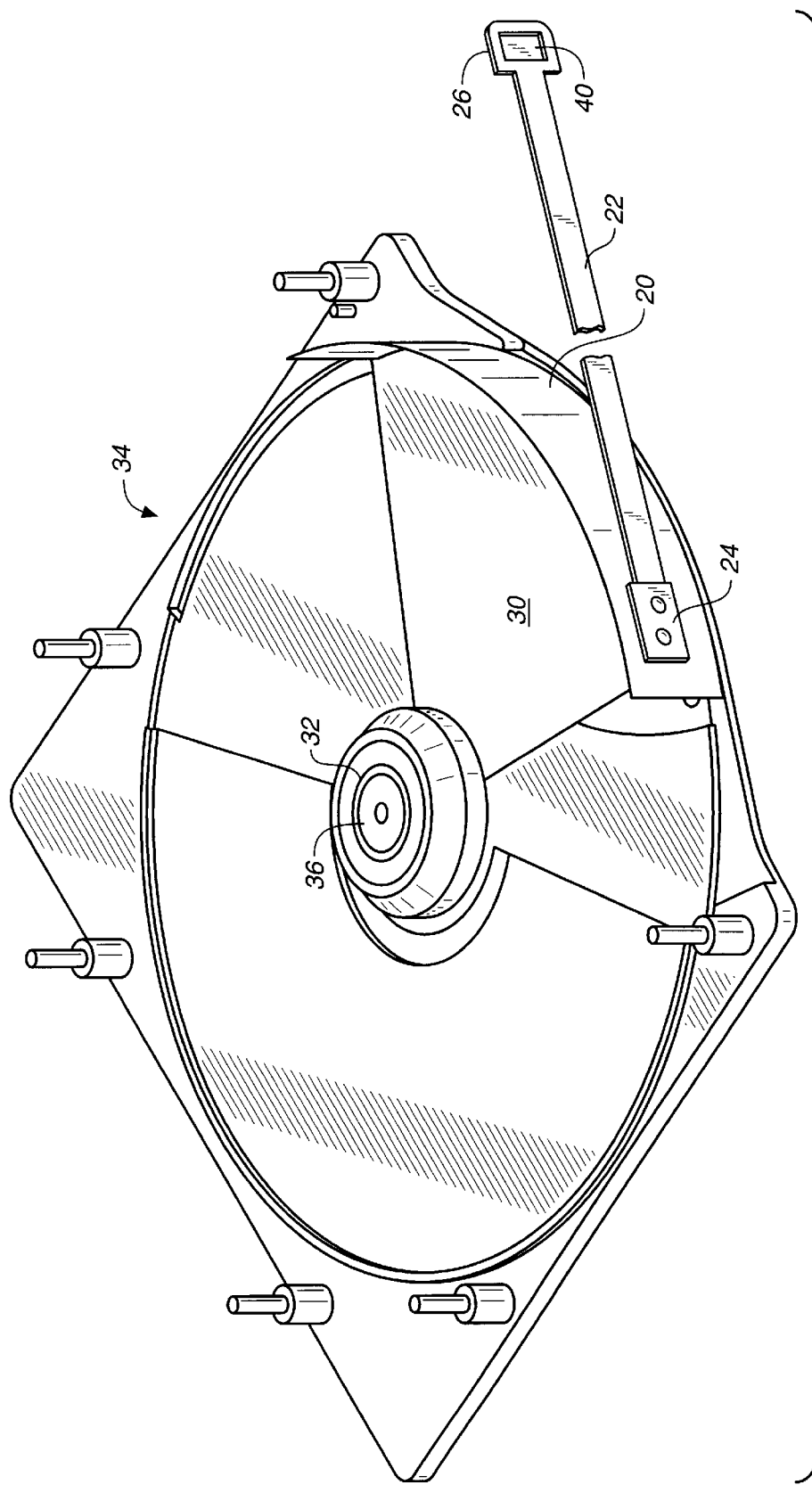
FIG._4

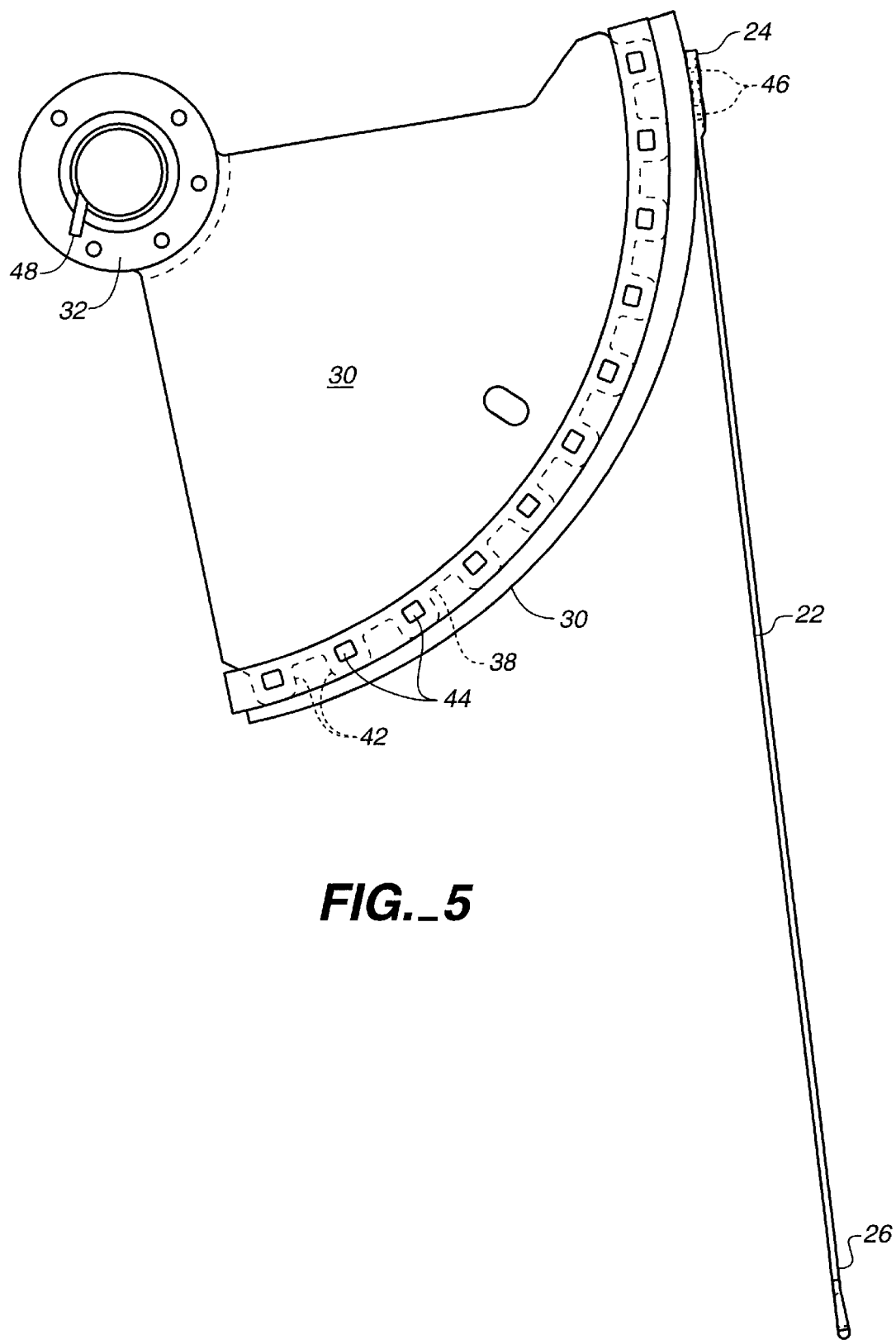
FIG._5

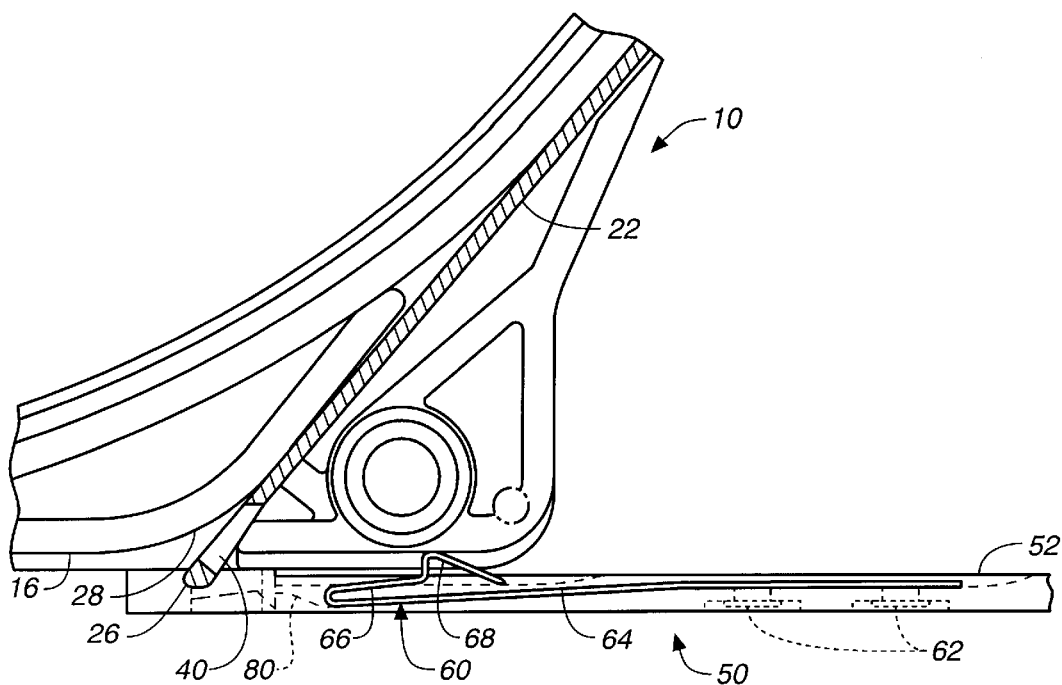
FIG._6
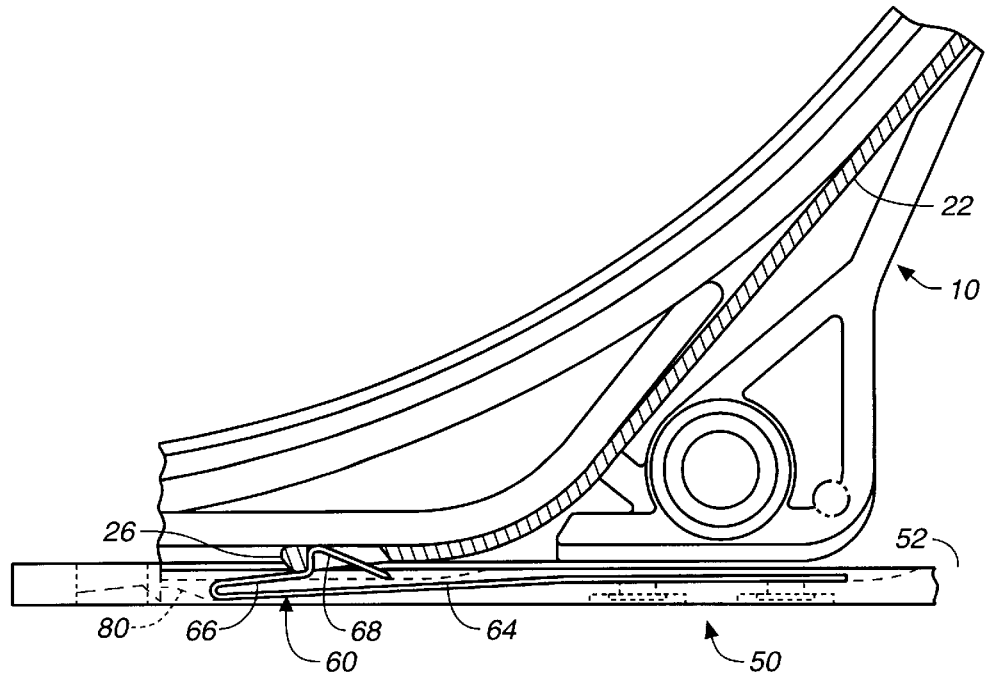
FIG._7

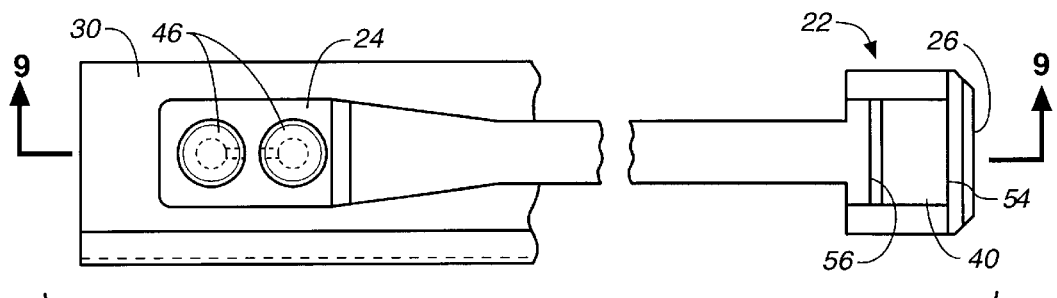
FIG._8
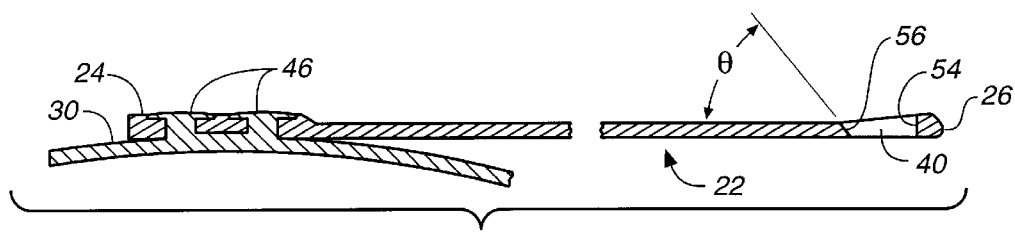
FIG._9
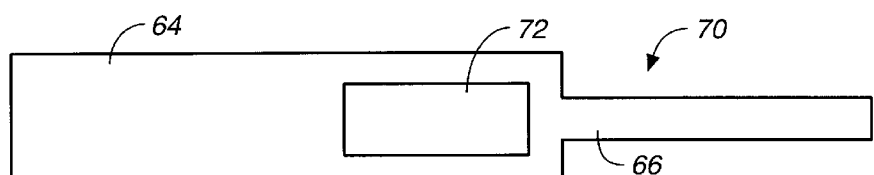
FIG._10
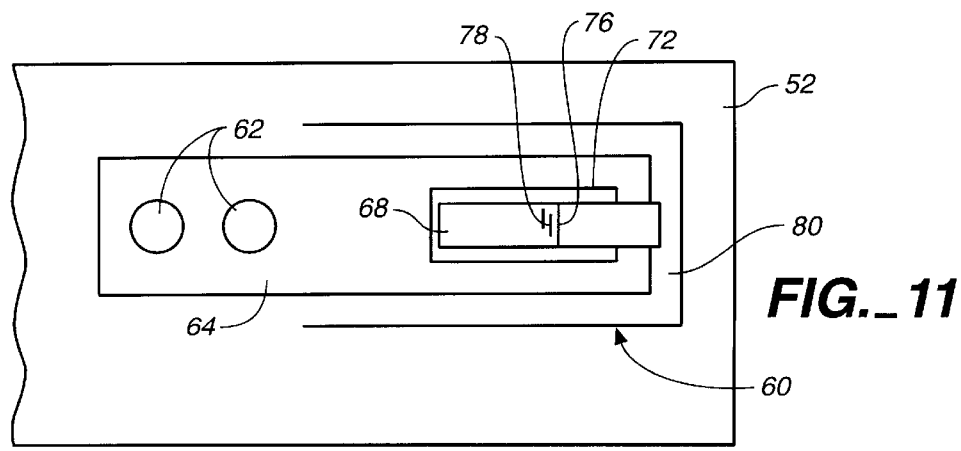
FIG._11

DISK CARTRIDGE WITH ROTATABLE CARTRIDGE DOOR

BACKGROUND OF THE INVENTION

1. Field of the Invention

The invention relates to a disk cartridge and a disk drive for data storage, and more particularly, the invention relates to a disk cartridge with a rotatable cartridge door and a disk drive with a mechanism for opening the cartridge door.

2. Brief Description of the Related Art

Data storage disk systems employing removable disk cartridges are generally used to add additional hard drive storage to a computer system or to provide backup storage capacity. The disk cartridges may contain either a single disk or more than one disk each having two recording surfaces. The disks within these disk cartridges are generally optical or magnetic disks of varying sizes and storage capacities.

Removable disk cartridges for storing digital electronic information typically include an outer cartridge housing containing one or more rotatable storage medium or disk upon which electronic information is stored. The cartridge housing includes upper and lower housing members which are joined together to protect and house the disk. The disk is mounted on a central hub assembly which holds the disk and allows the disk to rotate within the cartridge housing when data is being read from or written to the recording surfaces of the disk. When the disk cartridge is inserted into a disk drive, a spindle motor in the disk drive engages the disk hub in order to rotate the disk within the housing as a read/write head reads or writes data from or to recording surfaces of the disk.

The disk cartridge housing generally includes some form of an opening to provide the read/write head of the disk drive with access to the recording surfaces of the disk. A shutter or door mechanism is often provided which covers the cartridge opening when the cartridge is not in the disk drive to prevent damage to or contamination of the recording surfaces of the disks. As the disk cartridge is inserted into the disk drive the door mechanism is opened by a door activator of the disk drive to allow access to the recording surfaces of the disk.

One type of disk cartridge door commonly used is a sliding metal door which is mounted on an outside of the disk cartridge housing and slides laterally in grooves on the outside of the housing. This type of sliding door is opened when inserted into a disk drive by a moving door activator in the disk drive.

Rotatable cartridge doors are also known which are opened by a pivoting lever arrangement in the disk drive. The pivoting lever pushes against a tab on the outside of the cartridge door to open the door. These conventional lever arrangements for opening the rotatable disk cartridge doors increase the size of the disk drive.

Another type of disk cartridge door used when less vertical space is available is a metal band type door. The metal band is mounted between the top and bottom walls of the disk cartridge housing and slides in circular grooves formed in the top and bottom walls of the cartridge housing concentric with the disk. A portion of the band type door protrudes outside the disk cartridge and is engaged by an opening member inside the disk drive to open the door. However, the band type disk cartridge door assemblies have problems with particulate generation due to the engagement of sharp metal edges of the metal band door with the plastic cartridge housings. In addition, relatively thick top and bottom cartridge walls are required to form the grooves in which the metal band slides.

Accordingly, it would be desirable to provide a disk cartridge door assembly and door opening mechanism which requires a minimum vertical space. Further, it would be desirable to provide a door assembly in which all bearing interfaces have low friction and low wear to reduce particulate generation.

SUMMARY OF THE INVENTION

The present invention relates to a disk cartridge for data storage having a rotatable door assembly which is openable by a stationary door opening mechanism in a corresponding disk drive.

In accordance with one aspect of the present invention, a disk cartridge includes a cartridge housing, a disk assembly rotatably mounted within the cartridge housing, and an opening in the cartridge housing for providing access of a read/write head of a disk drive to the disk assembly. A cartridge door is movable between a closed position in which the cartridge door covers the opening in the cartridge and an open position in which the opening in the cartridge is uncovered. A flexible band is attached to the cartridge door at a first end and has a second end with an engagement member for engagement with a corresponding engagement member in the disk drive to open the cartridge door.

In accordance with an additional aspect of the present invention, a disk drive assembly includes a disk drive housing having a top wall, a bottom wall, and two side walls. The disk drive housing is configured to receive a disk cartridge from a front of the disk drive housing in an insertion direction which is substantially parallel to the two side walls. A read/write head is movably mounted within the disk drive housing for reading and writing data from and to the disk cartridge when the disk cartridge is received in the disk drive. A leaf spring hook is arranged on one of the two side walls in a position adjacent to the front the disk drive housing for engaging a flexible band of a cartridge door assembly of the disk cartridge to open the cartridge door as the disk cartridge is inserted into the disk drive.

In accordance with a further aspect of the invention, a method of opening a disk cartridge door includes inserting a disk cartridge into a disk drive in an insertion direction until an end of a flexible band of the disk cartridge engages a hook on an interior side wall of the disk drive, and opening the disk cartridge door by sliding the disk cartridge into the disk drive in the insertion direction while holding the end of the flexible band stationary inside the disk drive to rotate the disk cartridge door on a hub and allow access of a read/write head to the disk assembly within the disk cartridge.

According to a further aspect of the invention, a disk drive and disk cartridge assembly includes a disk cartridge having a rotatable data storage disk and a cartridge door movable between a closed and an open position, and a disk drive including a read/write head for reading and writing data from and to the data storage disk when the disk cartridge is received in the disk drive. A first engagement member is attached to the cartridge door for moving the cartridge door from the closed position to the open position. A second engagement member is mounted within the disk drive for engagement with the first engagement member to open the disk cartridge door as the disk cartridge is inserted into the disk drive. The first and second engagement members include a hook and an eye configured to be received on the hook.

The present invention provides advantages of a disk cartridge door which requires less vertical space than known door assemblies and which creates less particulate contamination of recording surfaces due to low friction interfaces.

BRIEF DESCRIPTION OF THE DRAWINGS

The invention will now be described in greater detail with reference to the preferred embodiments illustrated in the accompanying drawings, in which like elements bear like reference numerals, and wherein:

FIG. 1 is a top view of a disk cartridge according to the present invention;

FIG. 2 is a front view of the disk cartridge according to the present invention;

FIG. 3 is a side view of the disk cartridge according to the present invention;

FIG. 4 is a perspective view of a top of the disk cartridge housing with the door assembly rotatably mounted thereon;

FIG. 5 is a top view of the disk cartridge door assembly according to the present invention;

FIG. 6 is a top cross sectional view of the disk cartridge as it is inserted into a disk drive according to the present invention;

FIG. 7 is a top cross sectional view of the disk cartridge as it is inserted further into the disk drive and the cartridge door is opened by a hook inside the disk drive;

FIG. 8 is a side view of the flexible plastic band for opening the door assembly according to the present invention;

FIG. 9 is a cross sectional view of the flexible plastic band taken along line 9—9 of FIG. 8;

FIG. 10 is a side view of a metal part from which the leaf spring member according to the present invention is formed; and FIG. 11 is a side view of the leaf spring member according to the present invention mounted on the side wall of the disk drive.

DETAILED DESCRIPTION OF THE PREFERRED EMBODIMENTS

The present invention relates to a disk cartridge 10 with a rotatable cartridge door 20 rotatable between an open position and a closed position by pulling on a flexible band 22 attached to the cartridge door. When the disk cartridge 10 is inserted in a disk drive, the cartridge door 20 opens to allow a read/write head of the disk drive to access the recording surfaces of a disk within the disk cartridge. As shown in FIG. 1, the disk cartridge 10 has a curved front wall 12, a back wall 14, and two side walls 16. The curved front wall 12 has a curvature which corresponds to the shape and size of the disk within the disk cartridge 10.

FIG. 2 shows the front wall 12 of the disk cartridge having an opening 18 extending across a substantial portion of the curved front wall. The curved door 20 is positioned within the opening 18 and rotates from the closed position illustrated in FIG. 2 to an open position in which the disks inside the disk cartridge are accessible through the opening. The flexible band 22 extends along an outside surface of the door 20. The flexible band 22 has a first end 24 which is fixed to the rotatable door 20 and a second free end 26 extending through a slot in the side wall 16 of the cartridge.

FIG. 3 is a side view of the disk cartridge 10 showing a slot 28 in the cartridge side wall 16. The second end 26 of the flexible band 22 extends through the slot 28 such that the end of the flexible band can be caught by a hook of the disk drive to pull the door 20 to the opened position. In order to open the door 20, the hook within the disk drive grasps the end 26 of the flexible band 22 and holds the flexible band stationary in the disk drive as the disk cartridge is inserted. Accordingly, as the disk cartridge 10 is inserted into the disk drive, the flexible band 22 is drawn along the side wall 16 of the disk cartridge in the direction of the arrow A.

FIG. 4 is a perspective view of a top housing 34 of the disk cartridge 10 having the rotatable door 20 positioned in a partially opened position. The door 20 is formed on a wedge shaped door arm 30 which connects the door to a door hub 32. The door hub 32 is mounted for rotation with respect to the top housing 34 of the disk cartridge by positioning the hub over a central shaft of the housing and holding the hub on the housing with a cap member 36. The flexible band 22 is secured to the door at its first end 24. The free end 26 of the flexible band 22 has a rectangular opening 40 which is engaged by the leaf spring hook of the disk drive to open the door 20. The rectangular opening 40 forms a catch of the flexible band 22.

As shown in FIG. 5, the door 20 is insert molded over a curved outer edge 38 of the wedge shaped door arm 30. The door arm 30 is preferably a metal stamping having an outer edge 38 with a plurality of tooth-like features 42 and openings 44 which allow the plastic material of the door 20 to flow around the features securely molding the door to the arm. The door hub 32 is fixed to the door arm 30 by a known method such as heat staking. The first end 24 of the flexible band 22 is secured to the door 30 by one or more pins 46 which are ultrasonic welded or heat staked.

The door 30 is spring biased to return to the closed position when a force applied to the second end 26 of the flexible band 22 to open the door 30 has been removed. A torsion spring (not shown) provides the spring bias between the top housing portion 34 shown in FIG. 4, and the door hub 32. To provide the spring bias one end of the torsion spring is received in a slot 48 in the hub and an opposite end of the torsion spring is secured to the top housing 34.

FIG. 6 illustrates a front right corner of the disk cartridge 10 in cross section as it is inserted into a disk drive 50. The flexible band 22 extends though the slot 28 in the disk cartridge side wall 16. As the disk cartridge 10 is inserted into the disk drive 50, the rectangular opening 40 in the flexible band 22 is arranged to be engaged by a leaf spring hook 60 which is mounted on an interior side wall 52 of the disk drive 50 by rivets 62. As the disk cartridge 10 is inserted further into the disk drive 50, as shown in FIG. 7, the leaf spring hook 60 holds the flexible band 22 stationary within the disk drive causing the flexible band to be pulled back along the side wall 16 of the disk cartridge opening the disk cartridge door 20.

As shown in FIGS. 6 and 7, the leaf spring hook 60 includes a first leaf spring portion 64 which extends from the rivets 62 toward a front of the disk drive, and a second leaf spring portion 66 extending from the first leaf spring portion and including a hook 68. The second leaf spring portion 66 is bent at an angle of approximately 180 degrees with respect to the first leaf spring portion. This double leaf spring arrangement allows the hook 68 of the leaf spring to move in a direction which is substantially perpendicular to the side wall 52 of the disk drive 50 when the hook comes into contact with a side wall 16 of a disk cartridge 10 being inserted into the disk drive.

The flexible band 22 and the attachment of the band to the door 30 are illustrated in further detail in FIGS. 8 and 9. The flexible band 22 is preferably fixed to the door 30 by enlarged heads of two pins 46 which are formed by providing pins on the door, placing openings in the band over the pins and deforming the pins to form heads by application of either heat or ultrasonic energy. The rectangular opening 40 in the second end 26 of the flexible band 22 has a first edge 54 which is substantially perpendicular to the flat surfaces of the band. This first edge 54 of the opening 40 is the edge which is engaged by the hook 68 of the disk drive 50. A second edge 56 of the opening 40 is formed at an angle θ with respect to the flat surfaces of the band. This angle θ is preferably between 25 and 65 degrees and allows the flexible band 22 to lay flat against the side wall 16 of the disk cartridge 10 without interfering with the hook 68 as the disk cartridge 10 cartridge is inserted into the disk drive 50.

FIG. 10 illustrates a stamped metal part 70 which is used to form the leaf spring hook 60 according to the present invention. The stamped metal part 70 includes the first leaf spring portion 64 having a rectangular opening 72 and the second leaf spring portion 66 extending from the first leaf spring portion. When the stamped metal part 70 is formed into the leaf spring hook 60, the part is bent approximately 180 degrees between the first and second leaf spring portions 64, 66 so that the second leaf spring portion 66 overlies the rectangular opening 72. The hook portion 68 is formed in the stamped metal part 70 by making a first bend 76 of about 90 degrees and a second bend of between 40 and 70 degrees.

The formed leaf spring hook 60 is mounted on the side wall 52 of the disk drive 50 as shown in FIG. 11 by the rivets 62. In order to accommodate flexing of the leaf spring hook 60 in a direction substantially perpendicular to the side wall 52 of the disk drive 50, the side wall has a cut out portion 80 which accommodates the spring. This cut out portion 80, as shown in FIGS. 6 and 7, extends into the side wall 52 of the disk drive.

The operation of the present invention will be described with further reference to FIGS. 6 and 7 which illustrate the disk cartridge 10 as it is inserted into the disk drive 50. As the disk cartridge 10 is inserted into the disk drive 50, the side wall 16 of the disk cartridge slides along the interior side wall 52 of the disk drive. The flexible band 22 is fixed at one end to the door 30 of the disk cartridge. The flexible band 22 extends along the door 30 and out of the side wall 16 of the disk cartridge through the side wall opening 28. The second end 26 of the flexible band 22 is grasped by the hook 68 of the leaf spring hook 60 as the disk cartridge 10 is inserted into the disk drive 50. The hook 68 holds the end 26 of the flexible band stationary as the disk cartridge 10 is inserted causing the door 30 of the disk cartridge to be opened as the flexible band is drawn along the side wall 16 of the disk cartridge. When the disk cartridge 10 is removed from the disk drive 50 a tortion spring of the door hub 32 causes the disk cartridge door 30 to return to the closed position and the flexible band to return to the position illustrated in FIG. 6.

Although the present invention has been described as employing a catch on the flexible band and a hook inside the disk cartridge, it should be understood that other types of engagement members may also be used. For example, a hook may be formed on the end of the flexible band which engages a bar inside the disk cartridge. In addition, although the preferred embodiment employs a spring hook, a stationary hook may also be used, particularly when the flexible band provides some compliance.

According to another alternative embodiment of the present invention, the flexible band also forms the door of the disk cartridge by covering the disk cartridge opening with the flexible band.

The present invention provides the advantages of reduced particulate generation and contamination due to the fact that the door 20 and the disk cartridge 10 are both formed of low friction materials such as plastic which slide over one another without substantial particulate generation.

The present invention also provides the advantage of a door opening mechanism which takes up a minimal amount of vertical space allowing reduced disk cartridge size and corresponding reduced disk drive size.

While the invention has been described in detail with reference to the preferred embodiments thereof, it will be apparent to one skilled in the art that various changes and modifications can be made and equivalents employed, without departing from the present invention.

What is claimed is:

1. A disk cartridge comprising:
   a cartridge housing;
   a disk assembly rotatably mounted within the cartridge housing;
   an opening in the cartridge housing for providing access for a read/write head of a disk drive to the disk assembly;
   a rigid cartridge door movable between a closed position in which the cartridge door covers the opening in the cartridge and an open position in which the opening in the cartridge is uncovered; and
   a flexible band having a first end attached to the cartridge door and a second free end having an engagement member for engagement with a corresponding engagement member in the disk drive to open the cartridge door;
   wherein the cartridge door follows a first path between the closed position and the open position and the flexible band follows a second path different from said first path when the engagement member engages with the corresponding engagement member in the disk drive.

2. The disk cartridge according to claim 1, wherein the engagement member of the flexible band is a catch and the corresponding engagement member of the disk drive is a hook.

3. The disk cartridge according to claim 1, wherein the cartridge door is attached to a door hub rotatably mounted on the cartridge housing and the door is rotatable between the closed and open positions.

4. The disk cartridge according to claim 3, wherein an arm connects the cartridge door to the door hub and the arm is positioned substantially perpendicular to the cartridge door.

5. The disk cartridge according to claim 4, wherein the cartridge door is insert molded over an end of the arm opposite the door hub.

6. The disk cartridge according to claim 3, wherein the cartridge door is fixed on an arm at a same distance from the door hub in both the open position and the closed position.

7. The disk cartridge according to claim 1, wherein the cartridge housing includes a top wall, a bottom wall, a front wall having the opening therein, a back wall, and two side walls, and wherein one of the side walls has a slot through which the flexible band extends.

8. The disk cartridge according to claim 7, wherein the engagement member of the flexible band is located outside of the cartridge for engagement with the corresponding engagement member of the disk drive.

9. The disk cartridge according to claim 1, wherein the flexible band is fixed to the cartridge door at a first side of the cartridge door and extends along the cartridge door to a second side of the cartridge door where the engagement member of the flexible band extends outside the cartridge housing.

10. The disk cartridge according to claim 1, wherein the cartridge door is rotatably mounted on a top wall of the cartridge housing by a door hub.

11. The disk cartridge according to claim 10, wherein an axis of rotation of the door hub is substantially coincident with an axis of rotation of the disk assembly within the cartridge housing.

12. A disk drive assembly comprising:

a disk drive housing having a top wall, a bottom wall, and two side walls, the disk drive housing configured to receive a disk cartridge from a front of the disk drive housing in an insertion direction which is substantially parallel to the two side walls;

a read/write head movably mounted within the disk drive housing for reading and writing data from and to the disk cartridge when the disk cartridge is received in the disk drive assembly; and a leaf spring hook arranged on one of the two side walls and positioned adjacent the front of the disk drive housing for engaging a flexible band of a cartridge door assembly of the disk cartridge to open the cartridge door assembly as the disk cartridge is inserted into the disk drive;

wherein the leaf spring hook is a double leaf spring having a first leaf spring with a first end fixed to the side wall of the disk drive housing, and a second leaf spring extending from the first leaf spring, the second leaf spring being substantially bent in on the first leaf spring and having a hook shaped portion extending from the second leaf spring.

13. The disk drive assembly according to claim 12, wherein the first and second leaf springs of the leaf spring hook are formed from a single sheet with an approximately 180 degree bend between the first leaf spring and the second leaf spring.

14. The disk drive assembly according to claim 12, wherein the hook shaped portion of the second leaf spring includes an engagement surface arranged substantially perpendicular to the side wall for engagement with the flexible band.

15. The disk drive assembly according to claim 12, further comprising a disk cartridge having a movable disk cartridge door assembly with a flexible band attached to a disk cartridge door and the flexible band engageable by the leaf spring hook to open the disk cartridge door as the disk cartridge is inserted into the disk drive assembly in the insertion direction.

16. A method of opening a disk cartridge door comprising:

inserting a disk cartridge into a disk drive in an insertion direction until an end of a flexible band of the disk cartridge engages a hook on an interior side wall of the disk drive, wherein the flexible band is secured to a rotatable rigid cartridge door; and opening the rotatable rigid cartridge door by sliding the disk cartridge into the disk drive in the insertion direction while holding the end of the flexible band stationary inside the disk drive to rotate the cartridge door on a hub and allow access of a read/write head to a disk assembly within the disk cartridge;

wherein the cartridge door travels substantially along a first path and the flexible band travels substantially along a second path different from said first path during the method step of opening the rotatable rigid cartridge door.

17. The method of opening a disk cartridge door according to claim 16, wherein the end of the flexible band is held stationary within the disk drive by a leaf spring hook.

18. A disk drive and disk cartridge assembly comprising:

a disk cartridge having a rotatable data storage disk and a rigid cartridge door movable between a closed position and an open position;

a first engagement member attached to a flexible member on the rigid cartridge door for moving the cartridge door from the closed position to the open position;

a disk drive including a read/write head for reading and writing data from and to the data storage disk when the disk cartridge is received in the disk drive; and a second engagement member mounted within the disk drive for engagement with the first engagement member to open the disk cartridge door as the disk cartridge is inserted into the disk drive, wherein the first and second engagement members include a hook and an eye configured to be received on the hook;

wherein the rigid cartridge door travels along a first path and the flexible member travels along a second path different from said first path when the cartridge door is opened.

19. The disk drive and disk cartridge assembly according to claim 18, wherein the first engagement member comprises an eye and the second engagement member comprises a hook.

20. The disk drive and disk cartridge assembly according to claim 19, wherein the hook is a leaf spring hook.

21. The disk drive and disk cartridge assembly according to claim 18, wherein the cartridge door is rotatable and the second engagement member is substantially fixed within the disk drive.

22. The disk drive and disk cartridge assembly according to claim 18, wherein the first engagement member is formed on an end of a flexible band attached to the cartridge door.

23. The disk drive and disk cartridge assembly according to claim 22, wherein the flexible band is attached to the rigid cartridge door.

* * * * *